US010578392B2

(12) United States Patent
Mounsdon

(10) Patent No.: US 10,578,392 B2
(45) Date of Patent: Mar. 3, 2020

(54) ARROW RETRIEVAL SYSTEM

(71) Applicant: Monte A. Mounsdon, Garfield, MN (US)

(72) Inventor: Monte A. Mounsdon, Garfield, MN (US)

(*) Notice: Subject to any disclaimer, the term of this patent is extended or adjusted under 35 U.S.C. 154(b) by 0 days.

(21) Appl. No.: 16/134,510

(22) Filed: Sep. 18, 2018

(65) Prior Publication Data
US 2019/0084164 A1 Mar. 21, 2019

Related U.S. Application Data

(60) Provisional application No. 62/560,372, filed on Sep. 19, 2017.

(51) Int. Cl.
*F41B 5/14* (2006.01)
*B25J 15/00* (2006.01)
*F42B 6/04* (2006.01)

(52) U.S. Cl.
CPC ......... *F41B 5/1465* (2013.01); *B25J 15/0038* (2013.01); *F42B 6/04* (2013.01)

(58) Field of Classification Search
CPC .... B25B 27/02; B25J 15/0038; F41B 5/1465; F42B 6/04; F42B 6/06
USPC ...................................... 294/113, 102.1, 217
See application file for complete search history.

(56) References Cited

U.S. PATENT DOCUMENTS

| | | | | |
|---|---|---|---|---|
| 1,520,716 A * | 12/1924 | Judd | ......................... | H02G 1/02 114/218 |
| 1,720,037 A * | 7/1929 | Entwistle | ............... | H02G 1/081 24/136 R |
| 2,559,223 A * | 7/1951 | Murray | ..................... | B66C 1/48 24/136 R |
| 3,614,947 A | 10/1971 | Feldman | | |
| 4,905,397 A * | 3/1990 | Juelg, Jr. | ................... | F42B 6/04 43/6 |
| 5,445,424 A * | 8/1995 | Binette | .................... | B25C 11/00 294/102.1 |
| 5,468,034 A | 11/1995 | Kopel | | |
| 5,546,621 A | 8/1996 | Bulot | | |
| 5,743,340 A * | 4/1998 | Giacomini | ............... | A01B 1/16 172/371 |
| 6,517,453 B2 * | 2/2003 | LaSee | ....................... | F42B 6/04 124/86 |
| 6,739,030 B2 | 5/2004 | Miles | | |
| 6,854,776 B2 | 2/2005 | Downing | | |

(Continued)

*Primary Examiner* — Dean J Kramer
(74) *Attorney, Agent, or Firm* — Neustel Law Offices

(57) ABSTRACT

An arrow retrieval system for retrieving arrows from hard-to-reach locations such as when submerged in water. The arrow retrieval system generally includes a handle adapted to be grasped by an operator. A clamp may be connected to the handle, with the clamp being adapted to selectively and releasably clamp an arrow within the clamp. The clamp may be adjustable between a closed position and an engaged position. A bias member may be connected to the clamp such that the clamp is biased toward the closed position; with the clamp being adapted to adjust into the engaged position when an arrow is inserted into the clamp. In the engaged position the clamp engages with and secures the arrow within the clamp. With the arrow secured within the clamp, the handle may be pulled outwardly to dislodge and retrieve the arrow from any location in which it is stuck.

14 Claims, 16 Drawing Sheets

(56) References Cited

U.S. PATENT DOCUMENTS

| | | |
|---|---|---|
| 6,994,385 B2 | 2/2006 | Sigears |
| 7,234,219 B2 | 6/2007 | Deiter |
| 7,682,270 B2 | 3/2010 | De Buyer-Mimeure |
| 8,454,070 B2 | 6/2013 | Bierfreund |
| 9,109,852 B1 * | 8/2015 | Boester ................. F41B 5/1488 |
| 2005/0046209 A1 | 3/2005 | Bessette |
| 2012/0267586 A1 * | 10/2012 | Brown ................... B25B 27/02 |
| | | 254/30 |

* cited by examiner

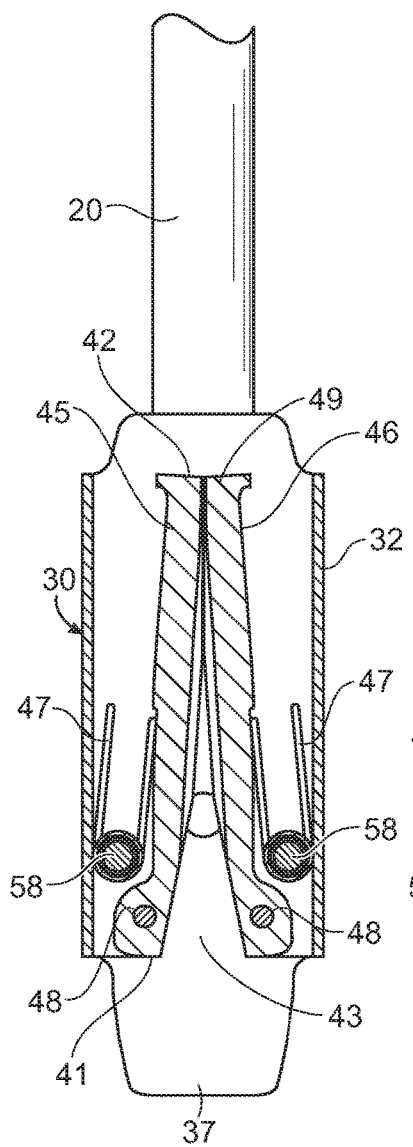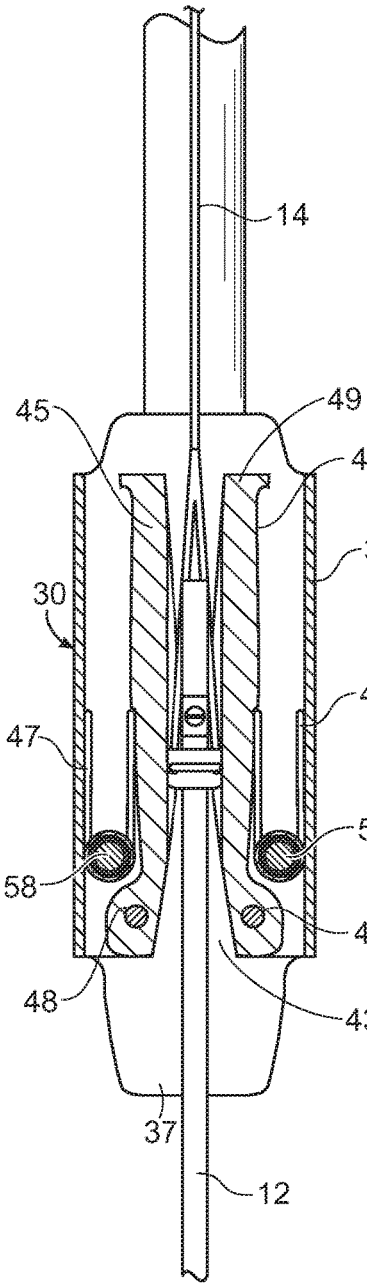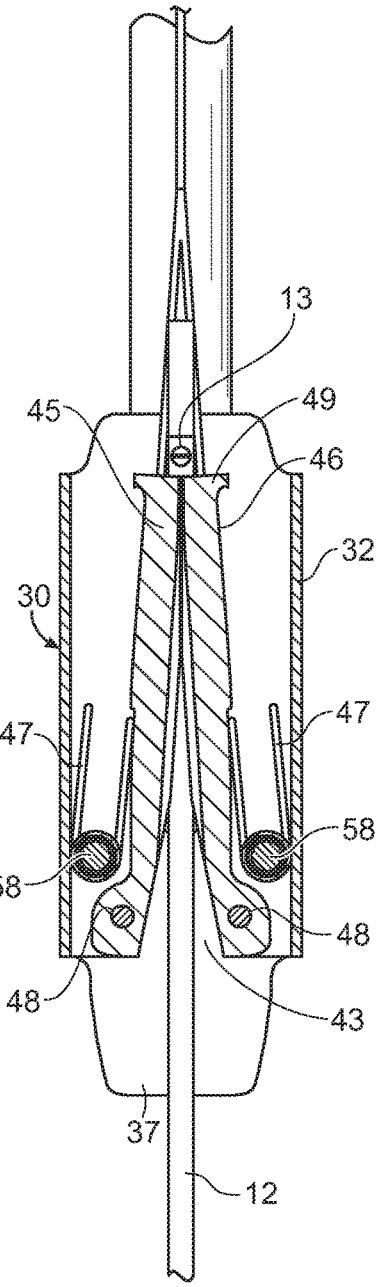

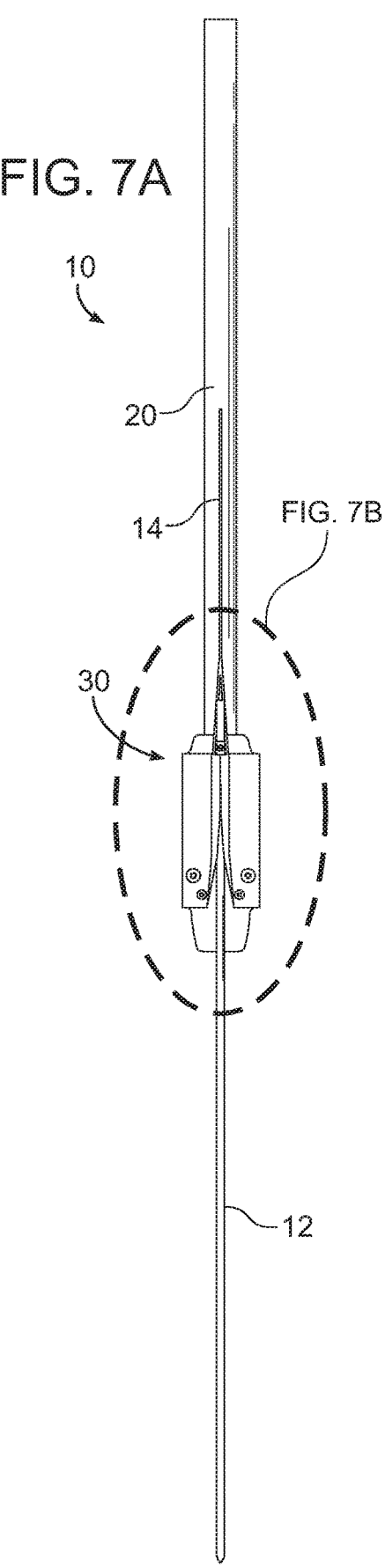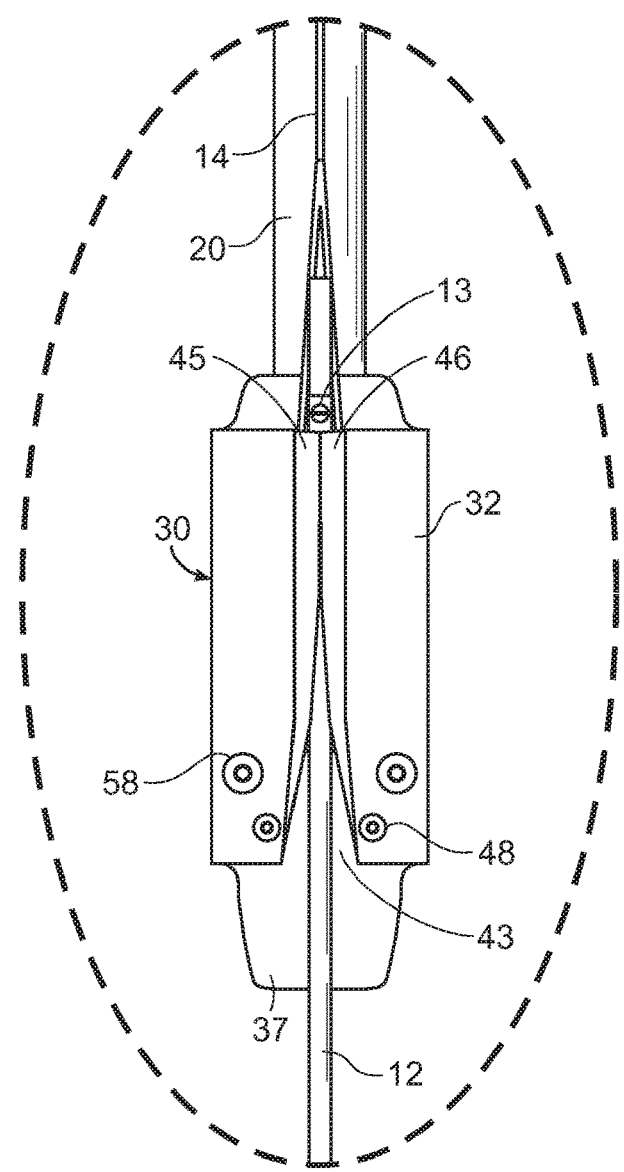

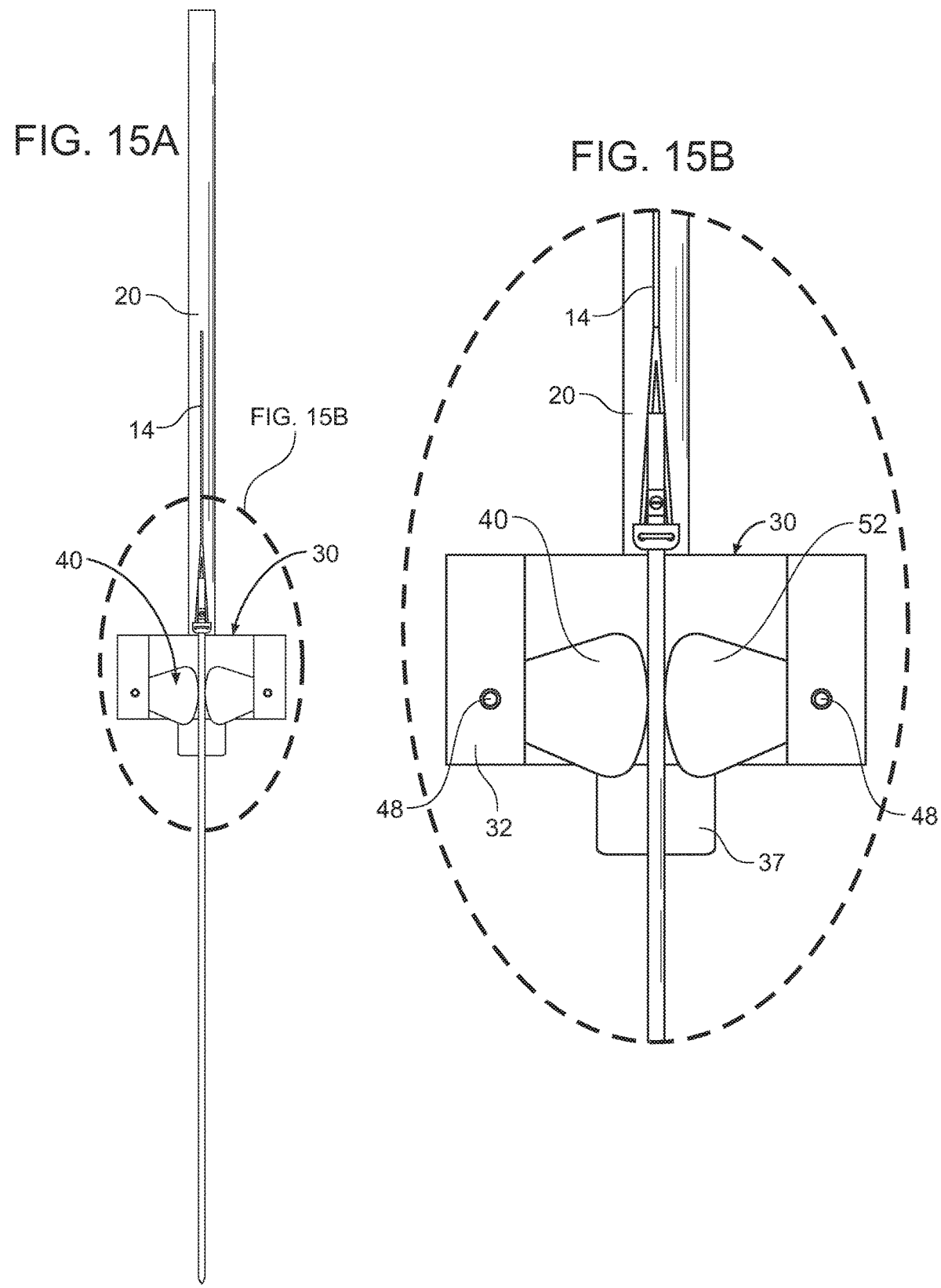

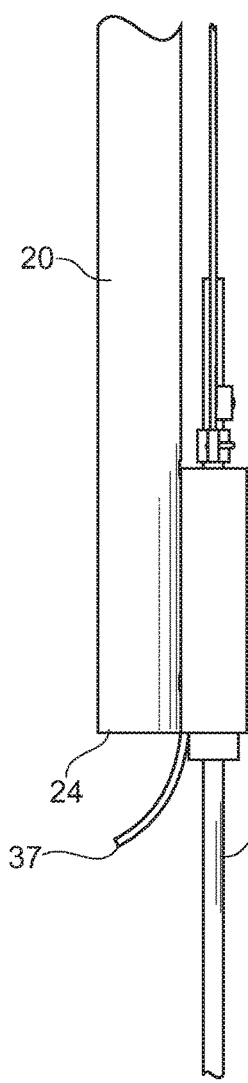
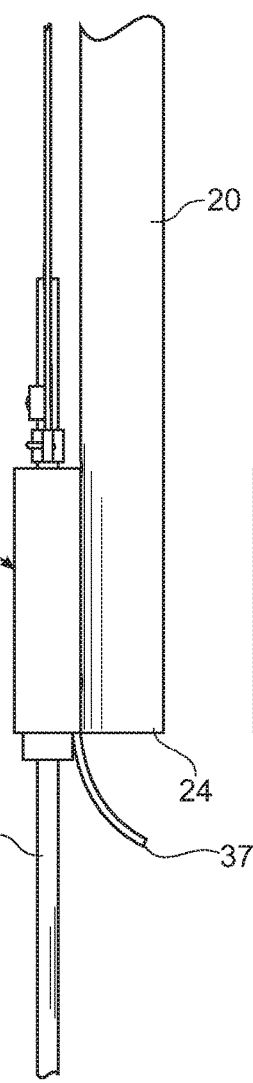
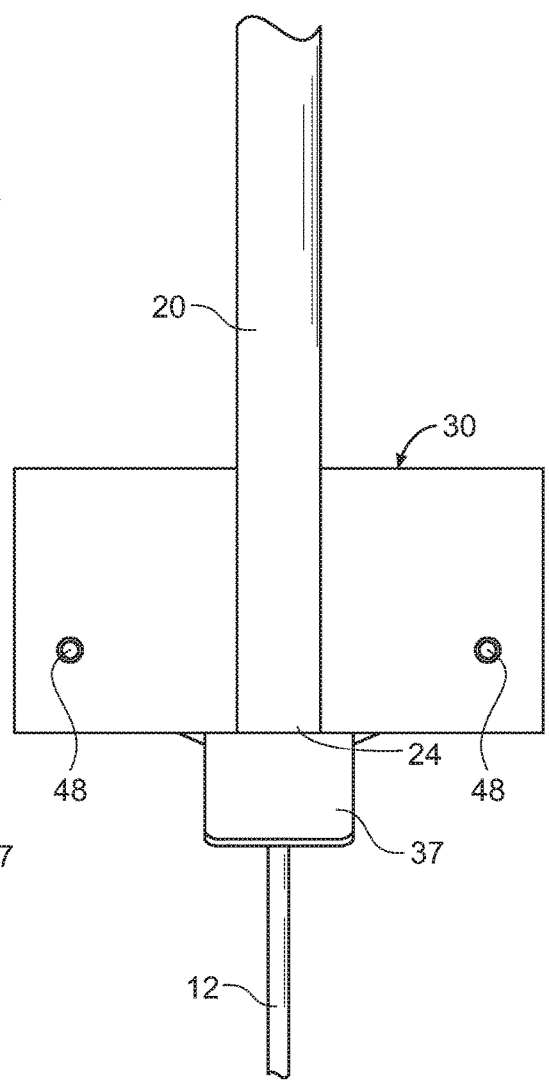
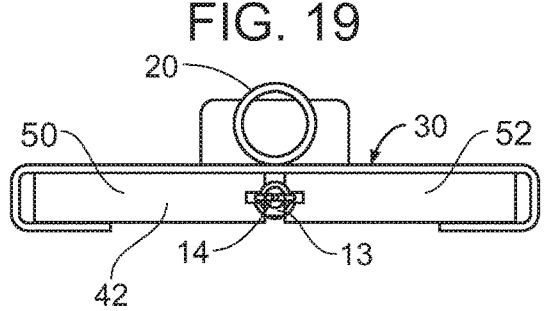
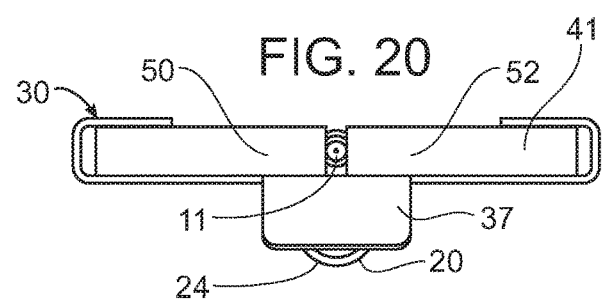

ARROW RETRIEVAL SYSTEM

CROSS REFERENCE TO RELATED APPLICATIONS

I hereby claim benefit under Title 35, United States Code, Section 119(e) of U.S. provisional patent application Ser. No. 62/560,372 filed Sep. 19, 2017. The 62/560,372 application is currently pending. The 62/560,372 application is hereby incorporated by reference into this application.

STATEMENT REGARDING FEDERALLY SPONSORED RESEARCH OR DEVELOPMENT

Not applicable to this application.

BACKGROUND

Field

Example embodiments in general relate to an arrow retrieval system for retrieving arrows from hard-to-reach locations such as when submerged in water.

Related Art

Any discussion of the related art throughout the specification should in no way be considered as an admission that such related art is widely known or forms part of common general knowledge in the field.

Bows have been used for a wide range of purposes throughout the centuries, including for bow hunting and bow fishing. Even the best archer misses his mark occasionally. When hunting or fishing with a bow, it is common that the arrow will become lodged in various locations. Given the high cost of arrows, it is not cost-efficient to abandon any such lodged arrows and it would be highly preferable that any such arrows be retrieved.

In the past, options for retrieval of arrows that have been lodged in various locations such as within water, in a tree, or a wide range of other locations and/or objects have been severely limited. The most common method of retrieval is to simply grasp the arrow with one or both hands and pull outwardly. However, this method of retrieval can fall short in numerous situations.

For example, the bare or even gloved hands of a hunter/fisher may not provide the leverage necessary to pull the arrow from wherever it is lodged. Additionally, when fishing, the arrow will commonly be in a depth of water that does not make hand-retrieval feasible without jumping into the water or, in some cases, diving to some depth.

SUMMARY

An example embodiment is directed to an arrow retrieval system. The arrow retrieval system includes a handle including a first end and a second end, wherein the first end is adapted to be grasped by an operator. A clamp may be connected to the handle, with the clamp being adapted to selectively and releasably clamp an arrow within the clamp. The clamp may be adjustable between a closed position and an engaged position. A bias member may be connected to the clamp such that the clamp is biased toward the closed position; with the clamp being adapted to adjust into the engaged position when an arrow is inserted into the clamp. In the engaged position the clamp may engage with and secure the arrow within the clamp. With the arrow secured within the clamp, the handle may be pulled outwardly to dislodge and retrieve the arrow from any location in which it is stuck.

There has thus been outlined, rather broadly, some of the embodiments of the arrow retrieval system in order that the detailed description thereof may be better understood, and in order that the present contribution to the art may be better appreciated. There are additional embodiments of the arrow retrieval system that will be described hereinafter and that will form the subject matter of the claims appended hereto. In this respect, before explaining at least one embodiment of the arrow retrieval system in detail, it is to be understood that the arrow retrieval system is not limited in its application to the details of construction or to the arrangements of the components set forth in the following description or illustrated in the drawings. The arrow retrieval system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 6A is a front sectional view of an arrow retrieval system without an arrow in accordance with an example embodiment.

FIG. 6B is a front sectional view of an arrow entering an arrow retrieval system in accordance with an example embodiment.

FIG. 6C is a front sectional view of an arrow secured within an arrow retrieval system in accordance with an example embodiment.

FIG. 7A is a front view of an arrow retrieval system in accordance with an example embodiment.

FIG. 7B is a front view of an arrow secured within a clamp of an arrow retrieval system in accordance with an example embodiment.

FIG. 15A is a front view of an arrow secured within a clamp of an arrow retrieval system in accordance with an example embodiment utilizing a pair of cam cleats.

FIG. 15B is a front view of an arrow secured within a clamp of an arrow retrieval system in accordance with an example embodiment utilizing a pair of cam cleats.

FIG. 16 is a first side view of an arrow retrieval system in accordance with an example embodiment utilizing a pair of cam cleats.

FIG. 17 is a second side view of an arrow retrieval system in accordance with an example embodiment utilizing a pair of cam cleats.

FIG. 18 is a rear view of an arrow retrieval system in accordance with an example embodiment utilizing a pair of cam cleats.

FIG. 19 is a top view of an arrow retrieval system in accordance with an example embodiment utilizing a pair of cam cleats.

FIG. 20 is a bottom view of an arrow retrieval system in accordance with an example embodiment utilizing a pair of cam cleats.

DETAILED DESCRIPTION

A. Overview

Figure 1:
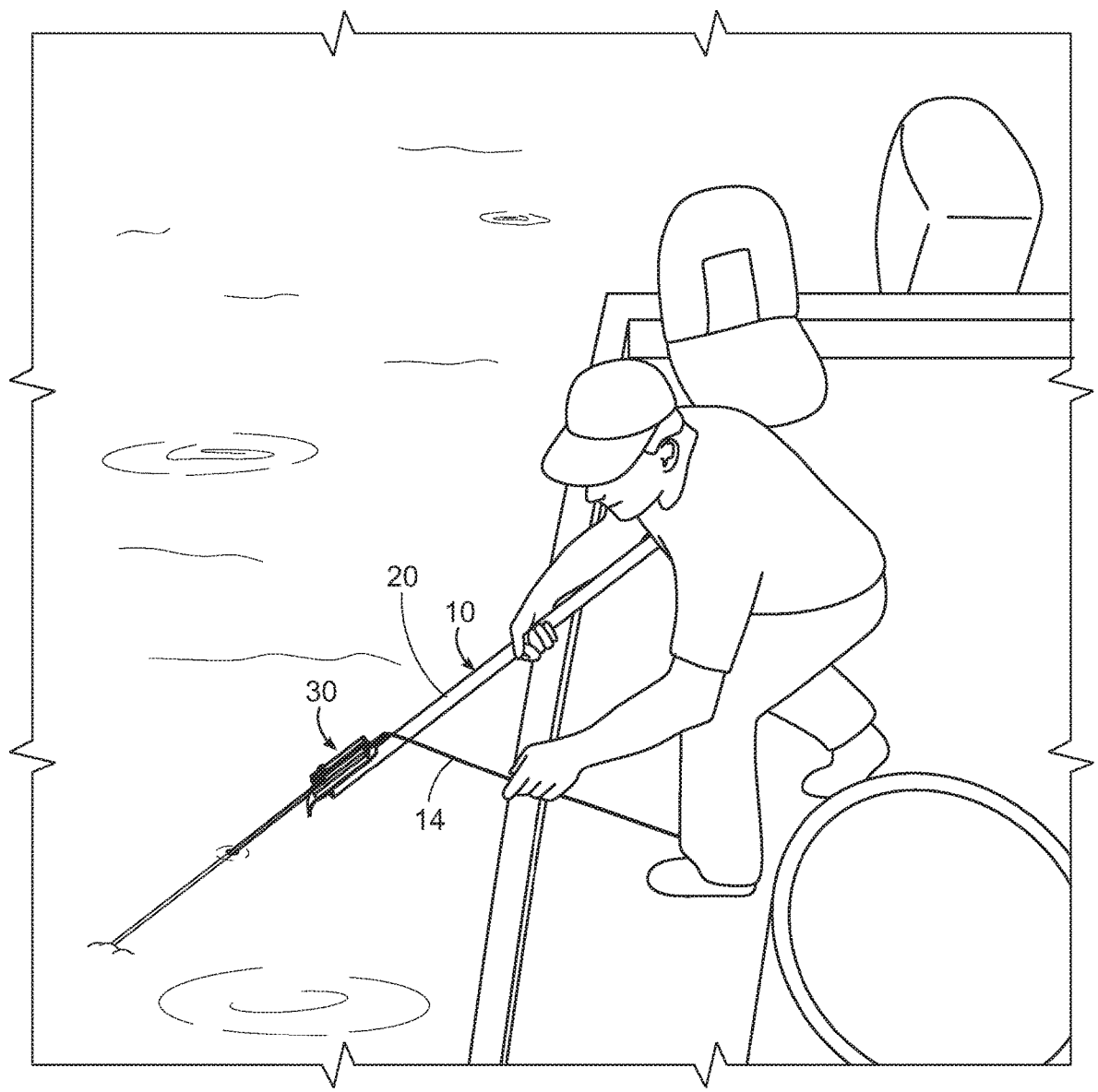
FIG. 1 is a perspective view of an arrow retrieval system in use to retrieve a submerged arrow in accordance with an example embodiment.

An example arrow retrieval system 10 generally comprises a handle 20 including a first end 22 and a second end 24, wherein the first end 22 is adapted to be grasped by an operator. A clamp 40 may be connected to the handle 20, with the clamp 40 being adapted to selectively and releasably clamp an arrow 11 within the clamp 40. The clamp 40 may be adjustable between a closed position and an engaged position. A bias member 47 may be connected to the clamp 40 such that the clamp 40 is biased toward the closed position; with the clamp 40 being adapted to adjust into the engaged position when an arrow 11 is inserted into the clamp 40. In the engaged position the clamp 40 engages with and secures the arrow 11 within the clamp 40. With the arrow 11 secured within the clamp 40, the handle 20 may be pulled outwardly to dislodge and retrieve the arrow 11 from any location in which it is stuck.

In an exemplary embodiment, the arrow retrieval system 10 may also comprise a bracket 32 which is connected to the handle 20; with the clamp 40 being connected to or within the bracket 32. The bias member 47 may be connected between the clamp 40 and the bracket 32. The bracket 32 may include a slot 36 through which a retrieved arrow 11 may be removed from the clamp 40. The clamp 40 may comprise a guide member 37 for guiding the arrow 11 into the clamp 40. The clamp 40 may comprise a stop 49 for engaging with a slide stop 13 (if present) of the arrow 11.

The bias member 47 may comprise a spring. The clamp 40 may comprise a first jaw 45 and a second jaw 46, with the first jaw 45 being pivotable with respect to the second jaw 46. The bias member 47 may comprise a first bias member 47 connected to the first jaw 45 and a second bias member 47 connected to the second jaw 46. The first jaw 45 and the second jaw 46 may be biased toward each other.

In an exemplary embodiment, the clamp 40 may comprise a first cam cleat 50 and a second cam cleat 52. The first cam cleat 50 and the second cam cleat 52 may be spring-biased toward each other. In another exemplary embodiment, the clamp 40 may comprise a cam cleat 50 and a stopper 54; with the arrow 11 being inserted between the cam cleat 50 and the stopper 54. The stopper 54 may include a backing member 56 to prevent damage and to increase grip.

In another exemplary embodiment, the arrow retrieval system 10 may comprise a handle 20 including a first end 22 and a second end 24, wherein the first end 22 is adapted to be grasped by an operator. A bracket 32 may be connected to the handle 20 and the clamp 40 may be connected to the bracket 32. The clamp 40 may be adapted to selectively and releasably clamp an arrow 11 within the clamp 40, wherein the clamp 40 is adjustable between a closed position and an engaged position. A first bias member 47 and a second bias member 47 may each be connected to the clamp 40 such that the clamp 40 is biased toward the closed position. The clamp 40 may be adapted to adjust into the engaged position when an arrow 11 is inserted into the clamp 40, wherein in the engaged position the clamp 40 engages with and secures the arrow 11 within the clamp 40. The clamp 40 may comprise a first jaw 45 and a second jaw 46 or a first spring-loaded cam cleat 50 and a second spring-loaded cam cleat 52. The first bias member 47 may be connected between the bracket 32 and the first jaw 45 and the second bias member 47 may be connected between the bracket 32 and the second jaw 46.

It should be appreciated that the systems and methods described herein may be utilized with a wide range of archery-based activities, including but not limited to hunting, fishing, and target practice. Anytime an arrow 11 may be lodged into a location from which it must be retrieved, the systems and methods described herein may be utilized. Although the figures illustrate retrieving an arrow 11 which has been submerged during fishing, the functionality of the methods and systems described herein should not be construed as so limited.

B. Handle

Figure 2:
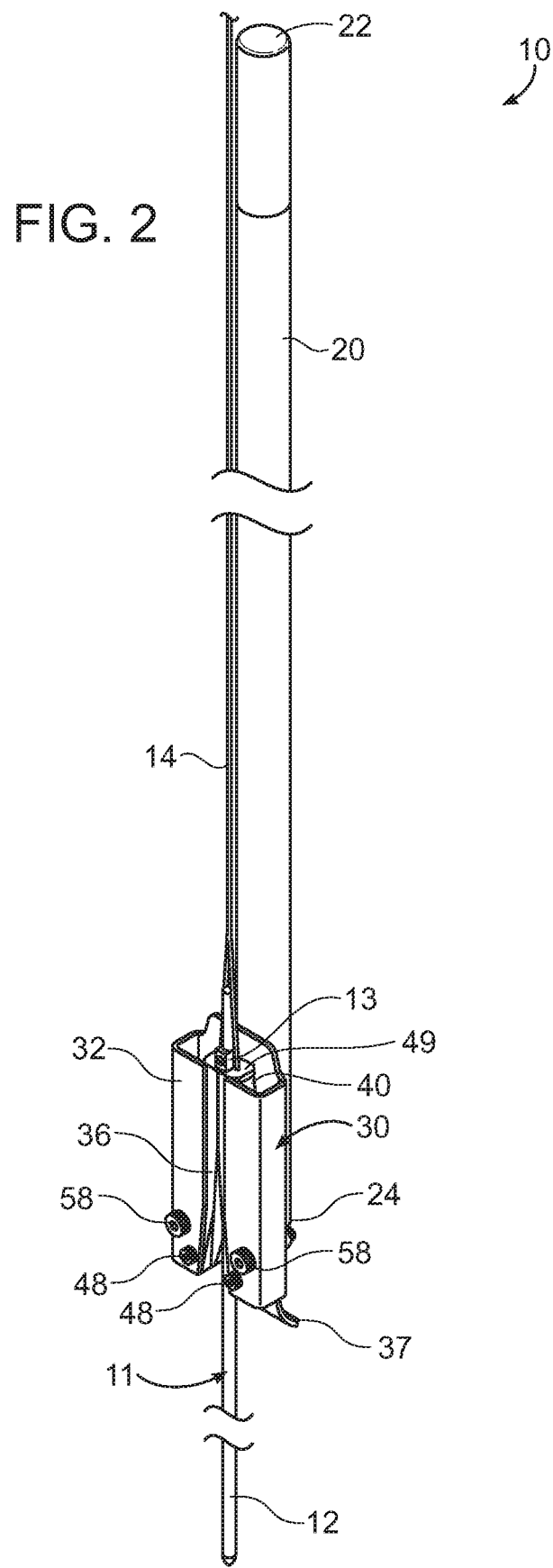
FIG. 2 is a perspective view of an arrow retrieval system in accordance with an example embodiment.

As shown in FIGS. 1-2, the handle 20 may comprise a first end 22 and a second end 24. The first end 22 may be grasped by a user. The second end 24 may include the retriever 30. While the figures illustrate that the retriever 30 is connected to the second end 24 of the handle 20, it should be appreciated that the retriever 30 may be connected to any other location along the handle 20 in different embodiments. By way of example and without limitation, the retriever 30 may be connected along the lower half of the handle 20.

The figures illustrate the handle 20 as comprising an elongated, tubular member. The handle 20 may be comprised of various configurations to suit different applications. For example, if arrow-fishing in deeper waters, a longer handle 20 may be necessary. Those who only arrow-fish in shallower waters would be more likely to prefer a shorter handle 20. In some embodiments, the handle 20 may be adjustable in length, such as telescopically-adjustable. The handle 20 could in some embodiments be greater than 4 feet long. Any length may be utilized.

Although the handle 20 is illustrated as extending linearly, the handle 20 could in some embodiments have other shapes. For example, the handle 20 could have a bend in it. The handle 20 could be flexible or rigid depending upon application. The handle 20 could in some embodiments include an ergonomic grip along its length, such as near the first end 22, for grasping by an operator of the arrow retrieval system 10.

C. Retriever

As shown in FIGS. 2-29, an exemplary embodiment of the arrow retrieval system 10 may comprise a handle 20 onto which is connected a retriever 30; the retriever 30 being adapted to selectively and releasably receive and secure an arrow 11 for retrieval. The exemplary embodiment shown in FIGS. 2-13 illustrates the retriever 30 as being comprised of a bracket 32 which includes a clamp 40 comprising a pair of jaws 45, 46 which are adapted to engage the arrow shaft 12 within the retriever 30 until released.

Figure 5:
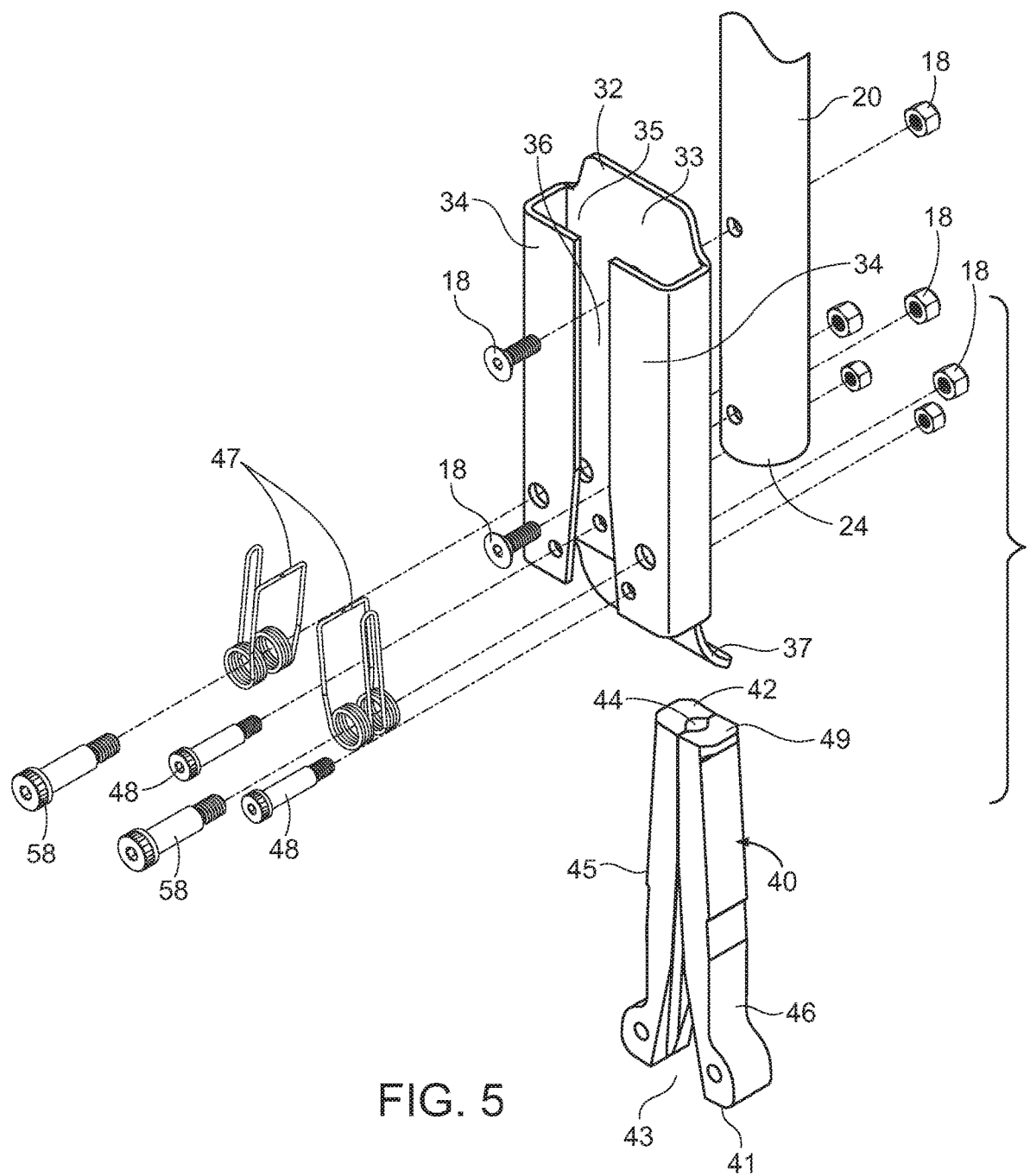
FIG. 5 is an exploded view of an arrow retrieval system in accordance with an example embodiment.

In the exemplary embodiment shown in FIG. 5, the retriever 30 is illustrated as being connected to the handle 20 by fasteners 18. The retriever 30 may be fixedly or removably connected to the handle 20. The retriever 30 may, in some embodiments, be integral with the handle 20 of a unitary structure. The retriever 30 may be connected to any location on the handle 20, and should not be construed as being limited to a connection point near the second end 24 of the handle 20 as shown in the exemplary figures.

The retriever 30 will generally include a clamp 40 which is adapted to selectively and releasably engage with the arrow shaft 12 when the arrow 11 is inserted into the retriever 30. The configuration of the retriever 30 and clamp 40 may vary in different embodiments. FIGS. 2-13 illustrate a clamp 40 comprises a pair of jaws 45, 46; each being biased toward each other by a bias member 47. FIGS. 14-21 illustrate a clamp 40 comprised of a pair of spring-biased cam cleats 50, 52. FIGS. 22-29 illustrate a clamp 40 comprised of a single cam cleat 50 which engages the arrow shaft 12 against a backing member 56.

Figure 3:
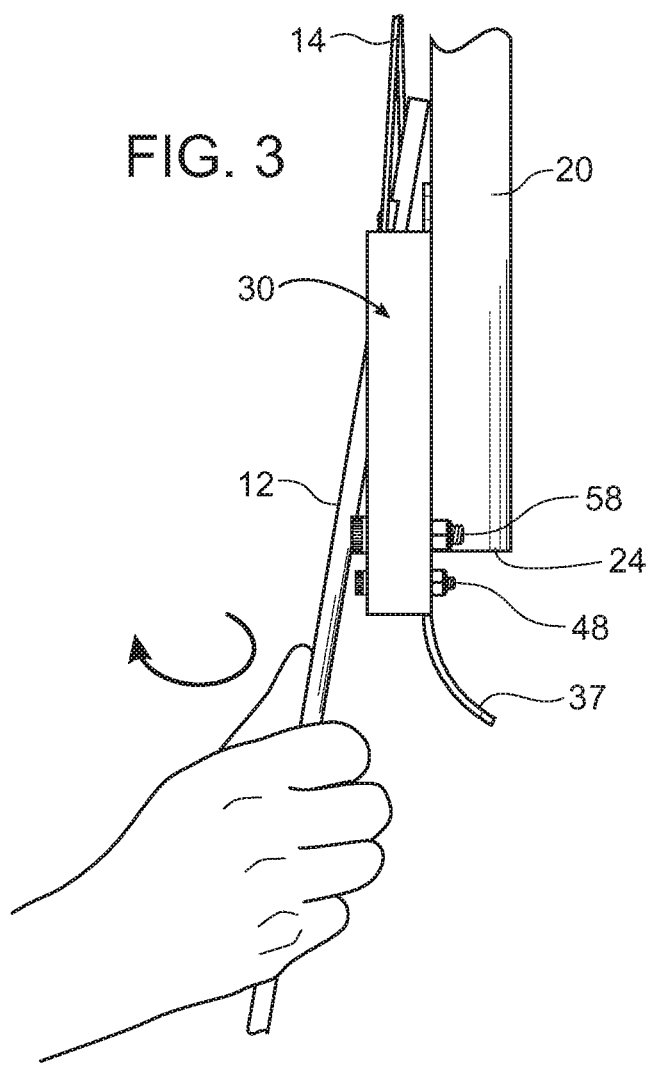
FIG. 3 is a perspective view of an arrow being removed from an arrow retrieval system in accordance with an example embodiment.
Figure 4:
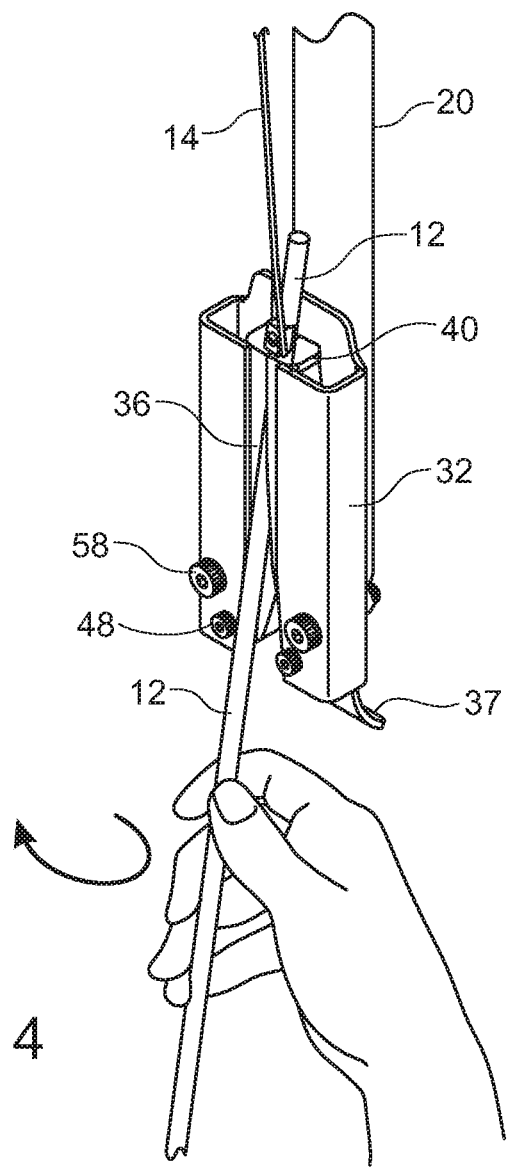
FIG. 4 is a perspective view of an arrow being removed from an arrow retrieval system in accordance with an example embodiment.

As shown in FIGS. 2-4, an exemplary embodiment of the retriever 30 may comprise a bracket 32 which is connected to the handle 20. As shown in FIG. 5, the bracket 32 may comprise a base 33 from which extend a pair of flanges 34. The base 33 may be connected to the handle 20, such as by fasteners 18 as shown in the figures.

The flanges 34 may rise first vertically and then horizontally at a right angle to form inverted L-shaped structures along the respective sides of the base 33 such as shown in FIGS. 2-5. The flanges 34 and base 33 may define a cavity 35 within the bracket 32 in which the clamp 40 may be secured such as discussed herein and shown in FIG. 5. The flanges 34 may be oriented such that they also define a slot 36 between the pair of flanges 34 through which the arrow shaft 12 may be removed from the retriever 30 when desired.

Figure 8:
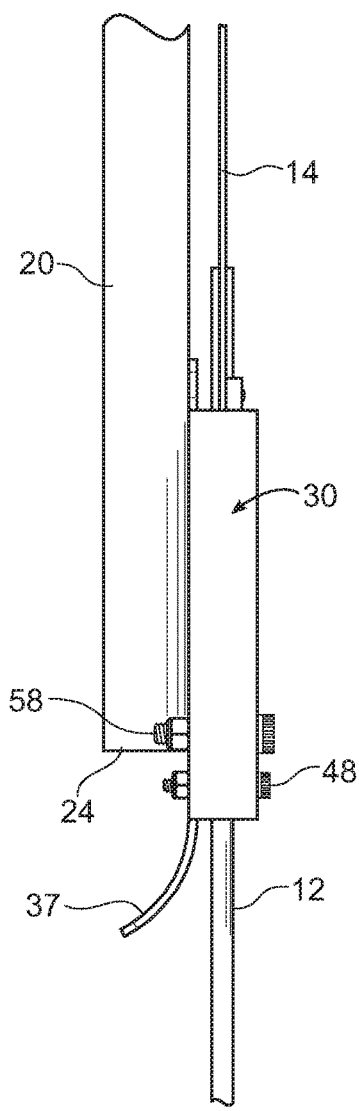
FIG. 8 is a first side view of an arrow retrieval system in accordance with an example embodiment.
Figure 9:
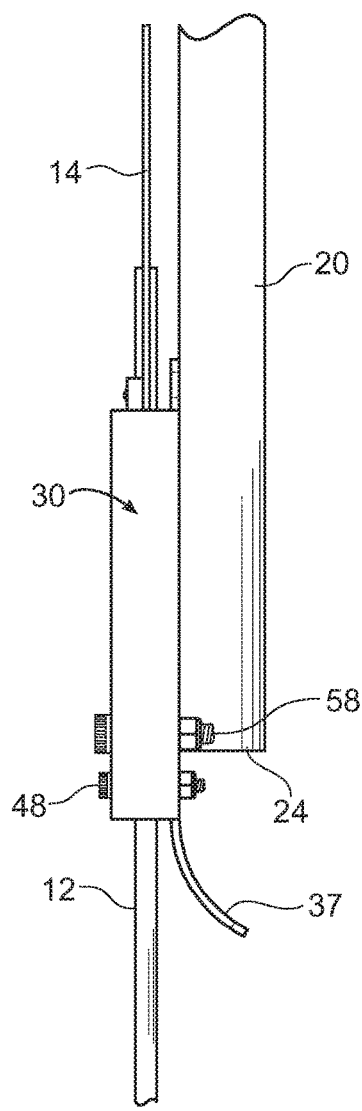
FIG. 9 is a second side view of an arrow retrieval system in accordance with an example embodiment.
Figure 10:
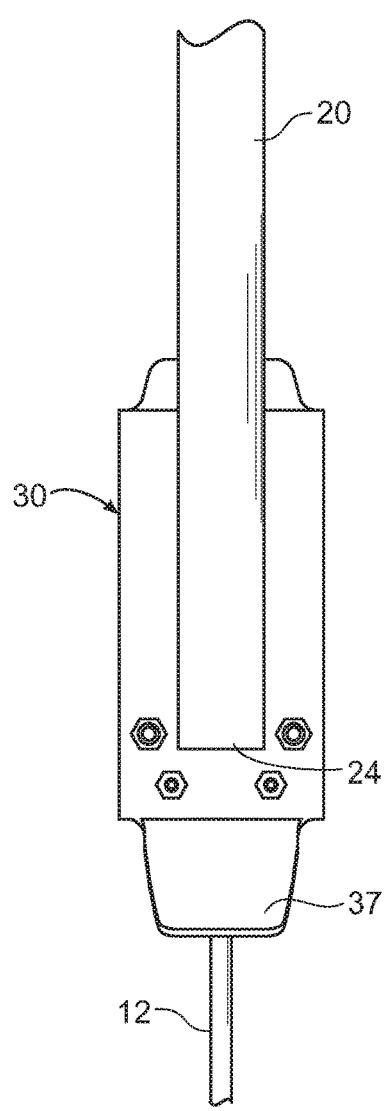
FIG. 10 is a rear view of an arrow retrieval system in accordance with an example embodiment.
Figure 11:
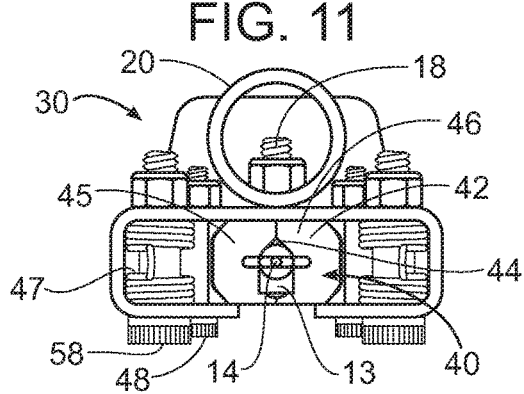
FIG. 11 is a top view of an arrow retrieval system in accordance with an example embodiment.
Figure 12:
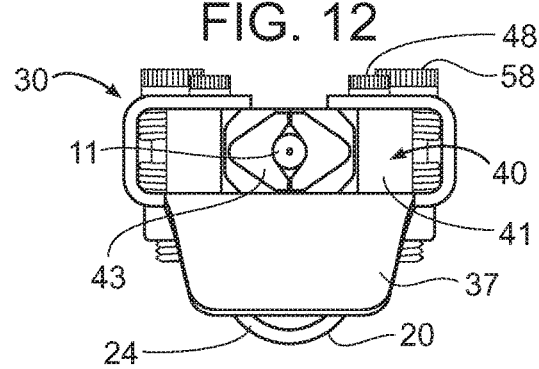
FIG. 12 is a bottom view of an arrow retrieval system in accordance with an example embodiment.

As best shown in FIGS. 8-12, the retriever 30 may include a guide member 37 which may be utilized to guide the arrow shaft 12 into the retriever 30. The guide member 37 may comprise a flange or other structure extending outwardly from the distal end of the retriever 30 such as shown in FIG. 8. By way of example and without limitation, the guide member 37 may comprise a curved flange as shown in the figures, a hook, a bracket, a slot, or any other structure capable of guiding an elongated member into the clamp 40. The guide member 37 may also keep the arrow shaft 12 from catching on the bottom edge of the bracket 32.

As shown in FIGS. 6A-6C, the retriever 30 may comprise a clamp 40 which is adapted to releasably and selectively engage with and secure the arrow shaft 12 within the retriever 30 until removed. The clamp 40 may be connected to the bracket 32, such as within the cavity 35 of the bracket 32 as shown in FIGS. 2-4. As shown in FIG. 5, fasteners 18 may be utilized to secure the clamp 40 within the bracket 32.

As shown in FIG. 5, the clamp 40 may comprise a first end 41 and a second end 42. The first end 41 is illustrated as facing away from the operator and the second end 42 is being illustrated as facing toward the operator. The clamp 40 may comprise one or more jaws 45, 46. The clamp 40 may comprise a first opening 43 at the first end 41 through which the arrow 11 may enter the retriever 30 and a second opening 44 at the second end 42 of the clamp 40 through which the arrow 11 may exit through other side before becoming lodged within the clamp 40.

In the embodiment shown in FIG. 6A, the clamp 40 is illustrated as comprising a pair of jaws 45, 46 which are both pivotally connected to each other and biased toward each other. Absent application of force, the jaws 45, 46 remain in a closed position. When an arrow 11 is inserted into the clamp 40 through the first opening 43, the arrow 11 exerts sufficient force to pry open up the jaws 45, 46 and allow the arrow shaft 12 to enter between the jaws. The arrow shaft 12 is then retained between the jaws 45, 46 by engagement, such as with a slide stop 13 coming in contact with the stop 49 or frictional engagement, caused by the bias force applied by a pair of bias members 47.

As shown in FIGS. 6A-6C, one or more bias members 47 may be utilized to exert a bias force upon the clamp 40 such that the clamp 40 is biased toward a closed position and so that the clamp 40 exerts a force against the arrow 11 when the arrow shaft 12 is within the clamp 40. The number of bias members 47 may vary in different embodiments. Additionally, the type of bias member 47 should not be construed as limited by the exemplary embodiments shown in the figures. Any bias member 47, including various types of springs, may be utilized so long as sufficient bias force is exerted against the clamp 40 such that the clamp 40 may secure an arrow 11 by frictional engagement when an arrow shaft 12 extends through the clamp 40.

In the exemplary embodiment shown in FIG. 6A, a pair of bias members 47 is illustrated: a first bias member 47 positioned between the first jaw 45 and the bracket 32 and a second bias member 47 positioned between the second jaw 46 and the bracket 32. As shown in the figures, the bias members 47 may be secured to the bracket 32, such as by shoulder bolts 58 or other types of fasteners. Other configurations may be utilized in different embodiments.

In the exemplary embodiment shown in FIG. 6A, the jaws 45, 46 are illustrated as being distally-separated at the first end 41 and together at the second end 42. Thus, the jaws 45, 46 may converge toward the second end 42 of the clamp 40.

The distal ends of each jaw 45, 46 may be connected to the bracket 32 by pivot pins 48 which allow the jaws 45, 46 to pivot toward or away from each other. Thus, the jaws 45, 46 may rotatably adjust either toward each other or away from each other by radial movement. The bias member 47 exerts force onto the outer end of the jaws 45, 46 to push them toward each other; and around an arrow shaft 12 when an arrow 11 is inserted within the clamp 40.

As shown in FIGS. 6A, 7A, and 7B, at the first end 41 of the clamp 40, the jaws 45, 46 are illustrated as being slightly separated to allow entry of the arrow 11. The jaws 45, 46 may be designed to guide the arrow shaft 12 into them. The jaws 45, 46 may spread apart as the arrow shaft 12 passes through them as downward pressure is applied to the handle 20; thus moving the jaws 45, 46 down the arrow shaft 12. The bias members 47 are positioned so as to push the jaws 45, 46 together with enough force to close on the arrow shaft 12 while the stop 49 provides a surface for the slide stop 13 of the arrow 11 to rest against.

Figure 13:
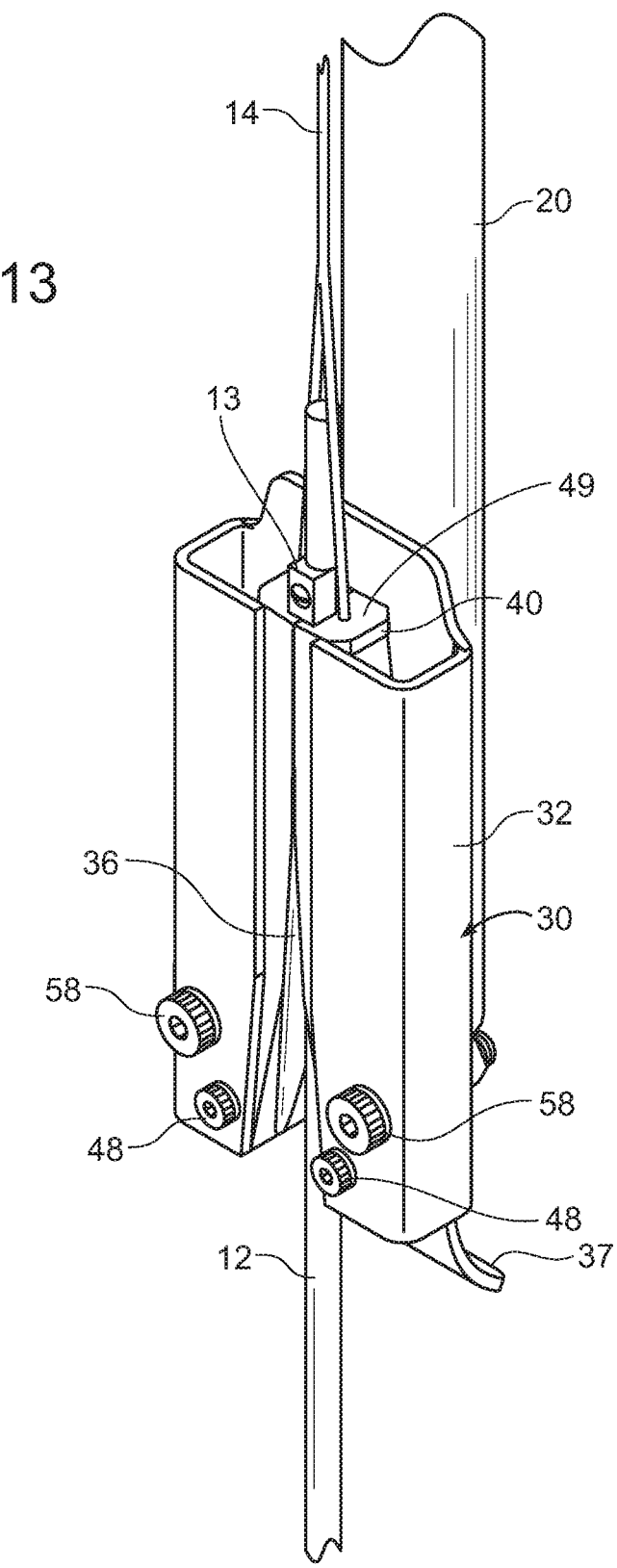
FIG. 13 is a perspective view of a retriever of an arrow retrieval system in accordance with an example embodiment.
Figure 14:
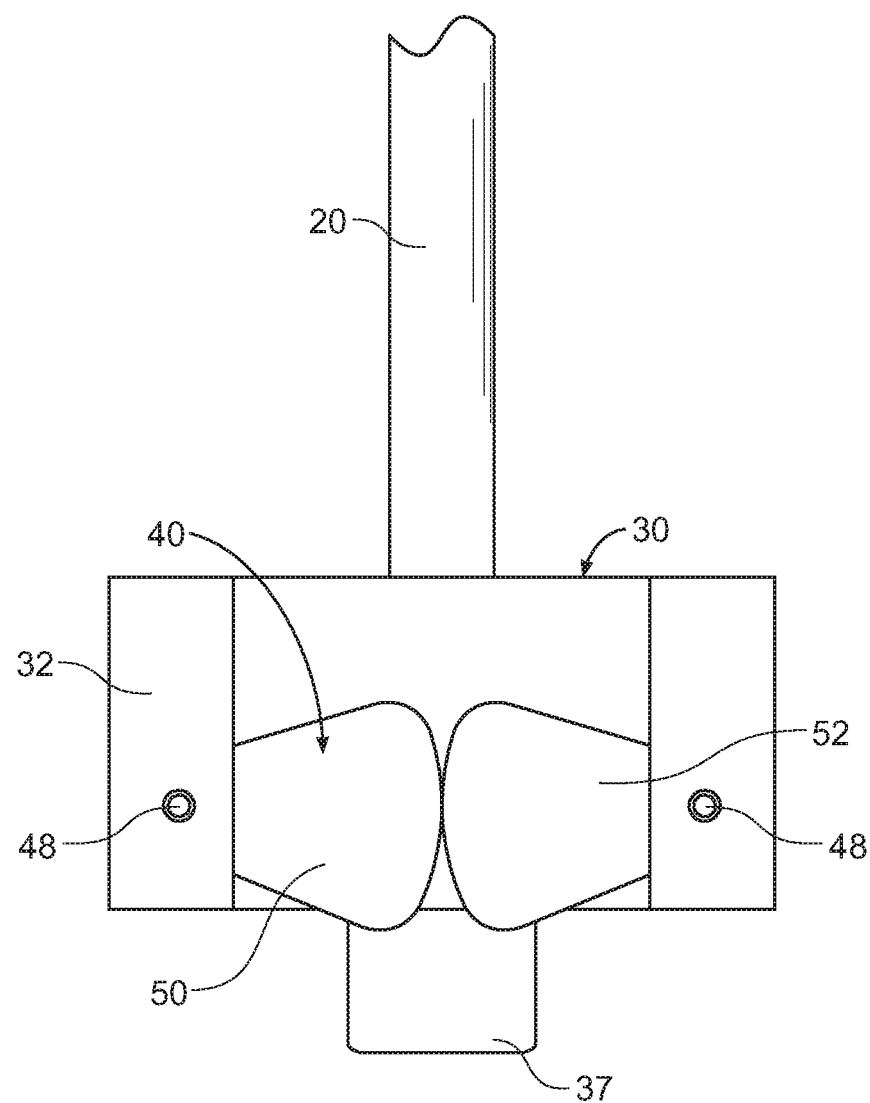
FIG. 14 is a front view of an arrow retrieval system in accordance with an example embodiment utilizing a pair of cam cleats.
Figure 21:
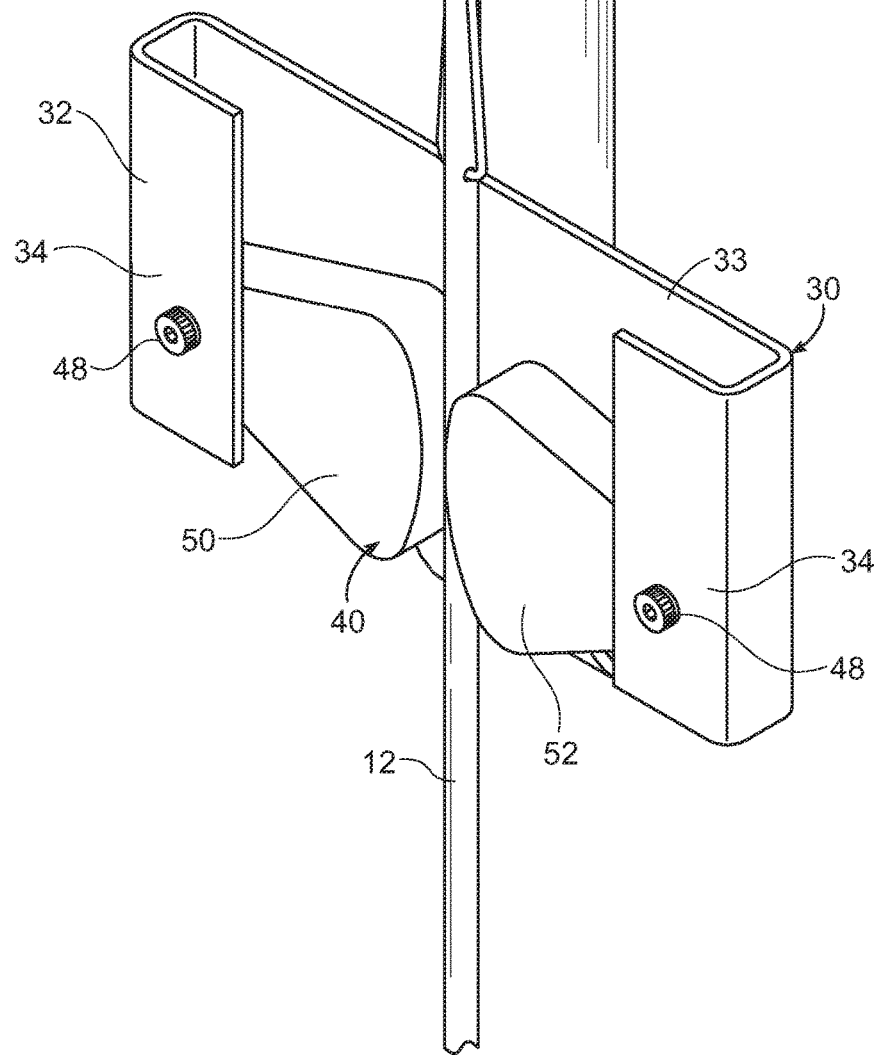
FIG. 21 is a perspective view of an arrow secured within an arrow retrieval system in accordance with an example embodiment utilizing a pair of cam cleats.
Figure 22:
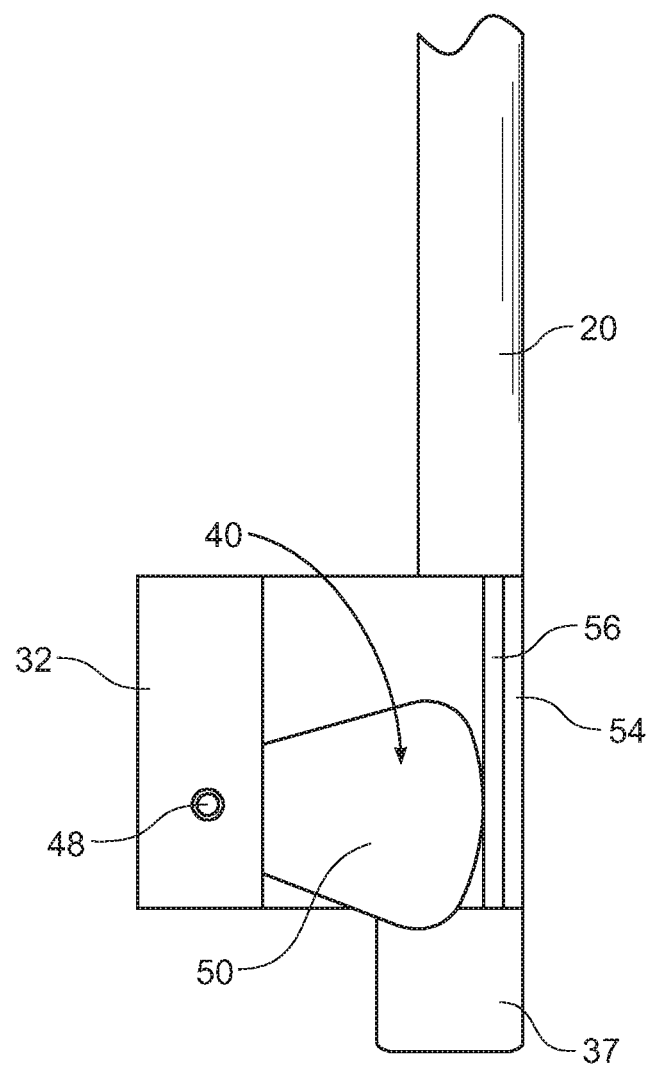
FIG. 22 is a perspective view of an arrow retrieval system in accordance with an example embodiment utilizing a single cam cleat.
Figure 23:
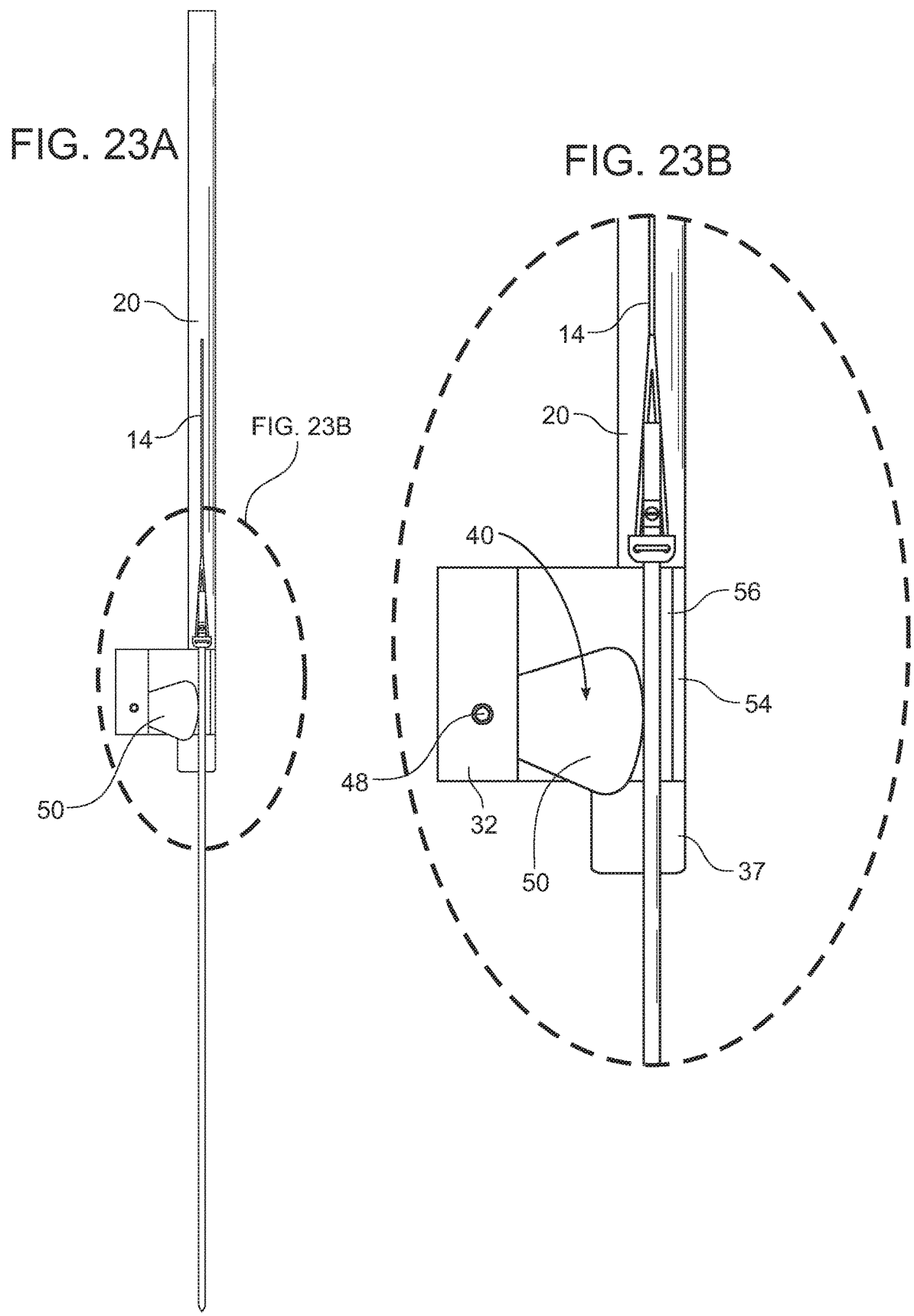
FIG. 23A is a front view of an arrow secured within a clamp of an arrow retrieval system in accordance with an example embodiment utilizing a single cam cleat.
FIG. 23B is a front view of an arrow secured within a clamp of an arrow retrieval system in accordance with an example embodiment utilizing a single cam cleat.
Figure 24:
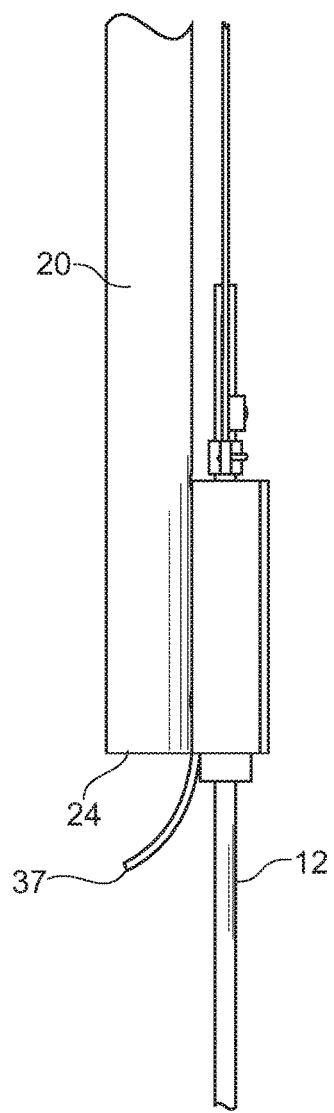
FIG. 24 is a first side view of an arrow retrieval system in accordance with an example embodiment utilizing a single cam cleat.
Figure 25:
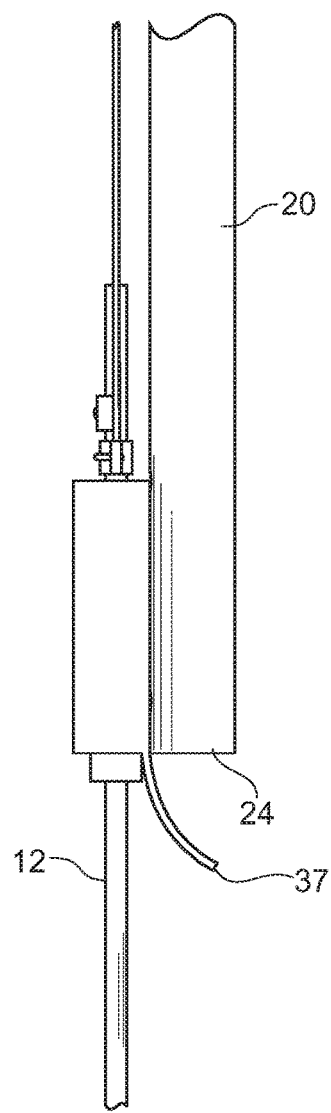
FIG. 25 is a second side view of an arrow retrieval system in accordance with an example embodiment utilizing a single cam cleat.
Figure 26:
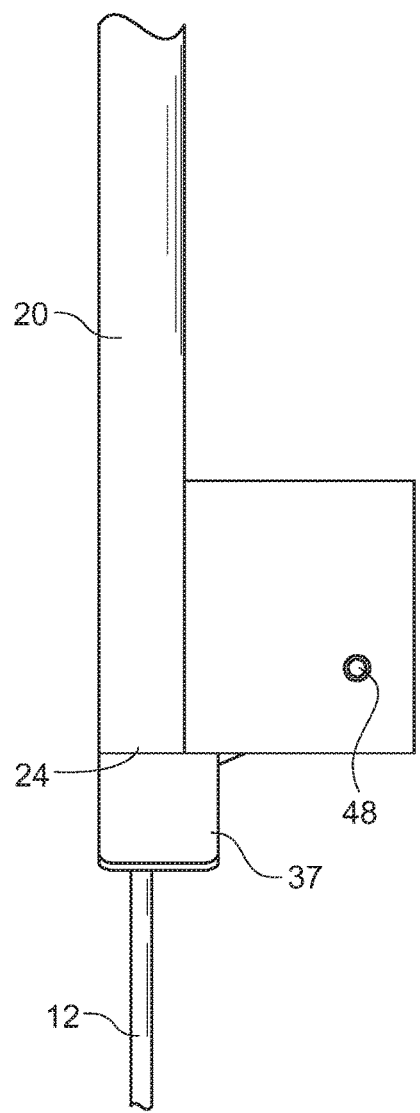
FIG. 26 is a rear view of an arrow retrieval system in accordance with an example embodiment utilizing a single cam cleat.
Figure 27:
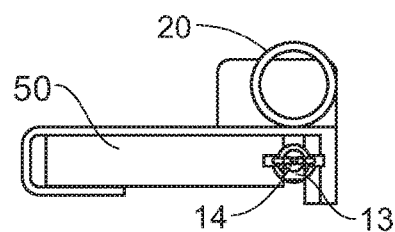
FIG. 27 is a top view of an arrow retrieval system in accordance with an example embodiment utilizing a single cam cleat.
Figure 28:
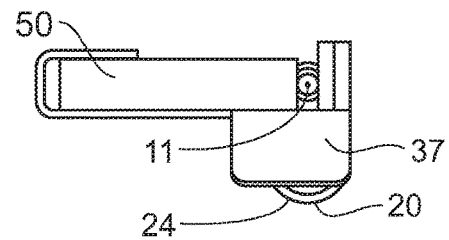
FIG. 28 is a bottom view of an arrow retrieval system in accordance with an example embodiment utilizing a single cam cleat.

As shown in FIG. 13, the second end 42 of the clamp 40 may include one or more stops 49 which may act to catch onto the slide stop 13 of the arrow 11. The stops 49 may simply comprise a surface, such as flanges on the second end 42 of the clamp 40, on which the slide stop 13 of the arrow 11 may catch onto. When pulled outwardly with the arrow 11 within the clamp 40, the stops 49 provide leverage against the slide stop 13 of the arrow 11 so that the arrow 11 may be removed. As best shown in FIG. 13, the stops 49 may be designed as a point for the slide stop 13 of the arrow 11 to come in contact with; thus providing a point of leverage for the handle 20 to pull the arrow shaft 12 out of whatever it is in embedded in.

FIGS. 14-21 illustrate an alternate embodiment which utilizes one or more cam cleats 50, 52 to clamp onto the arrow 11. It should be appreciated that the figures merely illustrate an exemplary embodiment of the cam cleats 50, 52. The type of cam cleat 50, 52 utilized may vary in different embodiments and should not be construed as limited by the exemplary figures.

In the exemplary embodiment of FIGS. 14-21, a first cam cleat 50 and a second cam cleat 52 are illustrated as being connected within a bracket 32. The cam cleats 50, 52 may be spring-loaded towards the first end 41 of the clamp 40. By pushing on the handle 20, the clamp 40 may slide over the arrow shaft 12 thus spreading the spring-loaded cam cleats 50, 52. As the operator pulls on the handle 20 outwardly, the spring-loaded cam cleats 50, 52 will grip on the arrow shaft 12. The harder the operator pulls, the tighter the spring-loaded cam cleats 50, 52 may grip on the arrow shaft 12; thus giving leverage to remove the arrow 11. Thus, the cam cleats 50, 52 may be utilized for frictional engagement with arrows 11 that do not include slide stops 13.

Figure 29:
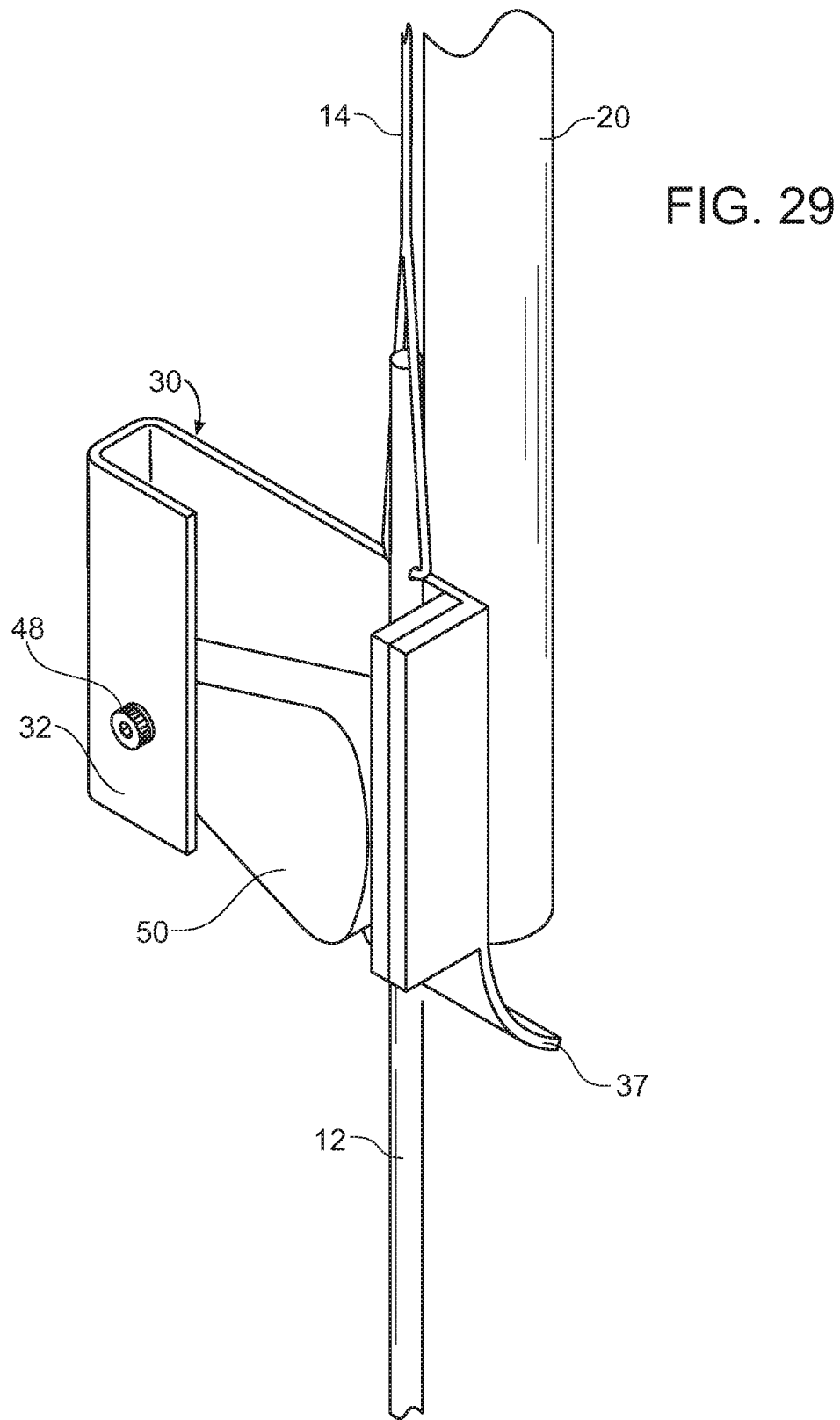
FIG. 29 is a perspective view of an arrow secured within arrow retrieval system in accordance with an example embodiment utilizing a single cam cleat.

FIGS. 22-29 illustrate another exemplary embodiment in which a single cam cleat 50 is utilized in combination with a stopper 54 on the bracket 32 to provide the gripping/clamping action necessary to retrieve the arrow 11. As shown in FIG. 29, a single cam cleat 50 is connected to the bracket 32 and biased against an opposing stopper 54 surface, such as a flange or wall. The stopper 54 may include a backing member 56 to improve grip on the arrow 11. The backing member 56 may comprise various types of materials, such as plastics or rubber. The arrow 11, when inserted, will become sandwiched between the single cam cleat 50 and the stopper 54 to allow retrieval of the arrow 11. As the operator pulls on the handle 20 outwardly, the spring-loaded cam cleat 50, will grip on the arrow shaft 12. The harder the operator pulls, the tighter the spring-loaded cam cleat 50, may grip on the arrow shaft 12; thus giving leverage to remove the arrow 11. Thus, the cam cleats 50, may be utilized for frictional engagement with arrows 11 that do not include slide stops 13.

D. Operation of Preferred Embodiment

In use, an operator need only approach the location that the arrow 11 is lodged. When in water, the operator will generally approach the location in which the arrow 11 is submerged. If the arrow 11 is out of water, the operator need only approach the location that the arrow 11 is stuck. For example, if the arrow 11 is lodged in a tree, the operator need only approach the tree to begin the arrow retrieval process.

To retrieve an arrow 11 which includes a string 14, the operator will first grasp the string 14 extending from the arrow 11 with his/her first hand. The operator may then grasp the handle 20 with his/her second hand to manipulate the arrow retrieval system 10 to grasp the arrow 11 such as shown in FIG. 1.

The handle 20 is manipulated so as to position the string 14 of the arrow 11 within the clamp 40 between the jaws 45, 46. With the alternate embodiment illustrated in FIG. 21, the string 14 may be positioned between the cam cleats 50, 52. With the alternate embodiment illustrated in FIG. 29, the string 14 may be positioned between the cam cleat 50 and stopper 54. In either case, the string 14 may be inserted within the clamp 40 so that the operator may "follow" the string 14 to reach the arrow shaft 12 with the retriever 30.

The operator may manipulate the handle 20, such as by pushing downwardly, pushing the clamp 40 along the string 14 and over the arrow shaft 12. As the arrow shaft 12 enters the clamp 40, it will be driven between the jaws 45, 46 of the clamp 40 or, in alternate embodiments, the cam cleats 50, 52 or cam cleat 50 and stopper 54. The bias members 47 will constantly exert a closing force on the jaws 45, 46 to ensure that the arrow shaft 12 is firmly secured within the clamp 40. FIG. 6A illustrates a clamp 40 without an arrow 11 inserted, FIG. 6B illustrates a clamp 40 with an arrow 11 being inserted, and FIG. 6C illustrates a clamp 40 with an arrow 11 inserted and ready to be retrieved.

The guide member 37 of the retriever 30 may be utilized to aid with guiding the clamp 40 over the arrow shaft 12. The guide member 37 may act as a lead-in to guide the arrow shaft 12 into the clamp 40. The guide member 37 may first be positioned against the string 14 to guide the clamp 40 when the handle 20 is pushed downwardly to engage the clamp 40 over the arrow shaft 12.

Many arrows 11 will commonly include a slide stop 13. The jaws 45, 46 will preferably extend over the arrow shaft 12 and over the slide stop 13, at which point the pushing force on the handle 20 may be stopped. The slide stop 13 will generally extend out of the second end 42 of the clamp 40; with the jaws 45, 46 being firmly clamped by the bias members 47 around the arrow shaft 12 below the slide stop 13 of the arrow 11. With arrows 11 that do not include a slide stop 13, the clamp 40 may be positioned over the nock-end of the arrow 11. This type of configuration is most common in the embodiments utilizing one or more cam cleats 50, 52 such as shown in FIGS. 14-29.

Once the arrow 11 is firmly secured within the clamp 40, the arrow 11 may be retrieved by the operator. The operator need only pull outwardly on the handle 20 to pull the arrow 11 out of the area in which it is lodged. Leverage on the arrow 11 will be provided by the clamp 40; with the arrow 11 being firmed secured within the clamp 40 such that the arrow 11 is pulled outwardly and upwardly with the clamp 40 when the handle 20 is pulled on by the operator. With arrows 11 that include a slide stop 13, the slide stop 13 will bear against the stop 49 of the clamp 40 to provide leverage. With arrows 11 that do not include a slide stop 13, frictional engagement may be utilized to secure the arrow 11 within the clamp 40.

Once the arrow 11 has been retrieved from the location in which it was lodged, the arrow 11 may be easily removed from the clamp 40 for further usage. As shown in FIGS. 3-4, the operator need only pull the arrow 11 out of the clamp 40 through the slot 36 of the retriever 30. The arrow 11 may be pulled diagonally upward or perpendicular to the retriever 30 so that the arrow 11 comes out of the slot 36 of the retriever 30. The clamp 40 will automatically adjust back into a fully-closed position due to force of the bias members 47 until used again.

Unless otherwise defined, all technical and scientific terms used herein have the same meaning as commonly understood by one of ordinary skill in the art to which this invention belongs. Although methods and materials similar to or equivalent to those described herein can be used in the practice or testing of the arrow retrieval system, suitable methods and materials are described above. All publications, patent applications, patents, and other references mentioned herein are incorporated by reference in their entirety to the extent allowed by applicable law and regulations. The arrow retrieval system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. An arrow retrieval system, comprising:
an arrow including a string extending from the arrow;
a handle including a first end and a second end, wherein the first end is adapted to be grasped by an operator;
a bracket connected to the handle;
a clamp connected to the bracket, the clamp being adapted to selectively and releasably clamp an arrow within the clamp, wherein the clamp is adjustable between a closed position and an engaged position, wherein the handle is parallel with respect to the clamp; and
a first bias member and a second bias member each being connected to the clamp such that the clamp is biased toward the closed position, wherein the clamp is adapted to adjust into the engaged position when an arrow is inserted into the clamp, wherein in the engaged position the clamp engages with and secures the arrow within the clamp; and
wherein in the engaged position the string of the arrow extends along the handle.

2. The arrow retrieval system of claim 1, wherein the clamp comprises a first cam cleat and a second cam cleat.

3. The arrow retrieval system of claim 1, wherein the clamp comprises a cam cleat.

4. An arrow retrieval system, comprising:
a handle including a first end and a second end, wherein the first end is adapted to be grasped by an operator;
a clamp connected to the handle, the clamp comprising a first jaw and a second jaw, wherein the clamp comprises a stop;
a first bias member connected to the first jaw;
a second bias member connected to the second jaw, wherein the clamp is biased toward a closed position by the first bias member and the second bias member;
an arrow adapted to be inserted into the clamp, wherein the first jaw and the second jaw are adapted to open when the arrow is inserted into the clamp, wherein the arrow includes a string extending from the arrow, wherein the string of the arrow extends along the handle when the arrow is inserted into the clamp; and
a slide stop on the arrow, wherein the slide stop is adapted to engage against the stop of the clamp when the arrow is inserted into the clamp so as to secure the arrow within the clamp.

5. The arrow retrieval system of claim 4, comprising a bracket connected to the handle, wherein the clamp is connected to the bracket.

6. The arrow retrieval system of claim 5, wherein the first bias member is connected between the clamp and the bracket, wherein the second bias member is connected between the clamp and the bracket.

7. The arrow retrieval system of claim 5, wherein the bracket comprises a slot for removing the arrow from the clamp.

8. The arrow retrieval system of claim 4, wherein the first bias member and the second bias member each comprise a spring.

9. The arrow retrieval system of claim 4, wherein the clamp comprises a guide member for guiding the arrow into the clamp.

10. An arrow retrieval system, comprising:
a handle including a first end and a second end, wherein the first end is adapted to be grasped by an operator;
a bracket connected to the handle;
a clamp connected to the bracket, the clamp comprising a first jaw and a second jaw, wherein the clamp comprises a stop;
a first bias member connected to the first jaw;
a second bias member connected to the second jaw, wherein the clamp is biased toward a closed position by the first bias member and the second bias member;
an arrow adapted to be inserted into the clamp, wherein the first jaw and the second jaw are adapted to open when the arrow is inserted into the clamp, wherein the arrow comprises a string extending from the arrow; and
a slide stop on the arrow, wherein the slide stop is adapted to engage against the stop of the clamp when the arrow is inserted into the clamp so as to secure the arrow within the clamp, wherein the string of the arrow extends along the handle when the arrow is inserted into the clamp.

11. The arrow retrieval system of claim 10, wherein the first bias member is connected between the clamp and the bracket, wherein the second bias member is connected between the clamp and the bracket.

12. The arrow retrieval system of claim 10, wherein the bracket comprises a slot for removing the arrow from the clamp.

13. The arrow retrieval system of claim 10, wherein the first bias member and the second bias member each comprise a spring.

14. The arrow retrieval system of claim 10, wherein the clamp comprises a guide member for guiding the arrow into the clamp.

* * * * *